(12) United States Patent
Cao et al.

(10) Patent No.: US 11,461,908 B2
(45) Date of Patent: Oct. 4, 2022

(54) IMAGE PROCESSING METHOD AND APPARATUS, AND IMAGE PROCESSING DEVICE USING INFRARED BINOCULAR CAMERAS TO OBTAIN THREE-DIMENSIONAL DATA

(71) Applicant: BEIJING KUANGSHI TECHNOLOGY CO., LTD., Beijing (CN)

(72) Inventors: Zhiri Cao, Beijing (CN); Mu Yang, Beijing (CN); Keqing Chen, Beijing (CN); Zhixian Liu, Beijing (CN); Yan Gao, Beijing (CN); Zhe Yang, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/266,490

(22) PCT Filed: Aug. 5, 2019

(86) PCT No.: PCT/CN2019/099261
§ 371 (c)(1),
(2) Date: Feb. 5, 2021

(87) PCT Pub. No.: WO2020/029917
PCT Pub. Date: Feb. 13, 2020

(65) Prior Publication Data
US 2021/0304428 A1 Sep. 30, 2021

(30) Foreign Application Priority Data

Aug. 6, 2018 (CN) .......................... 201810888231.9

(51) Int. Cl.
*G06T 7/521* (2017.01)
*G06T 7/593* (2017.01)
(Continued)

(52) U.S. Cl.
CPC ............ *G06T 7/521* (2017.01); *G06K 9/6215* (2013.01); *G06T 7/593* (2017.01); *G06V 10/60* (2022.01);
(Continued)

(58) Field of Classification Search
CPC ..................... G06T 7/521; G06T 7/593; G06T 2207/10028; G06T 2207/10048; H04N 13/204; H04N 13/271; H04N 13/293
See application file for complete search history.

(56) References Cited

U.S. PATENT DOCUMENTS

2006/0086794 A1  4/2006  Knowles et al.
2007/0103460 A1  5/2007  Zhang et al.
(Continued)

FOREIGN PATENT DOCUMENTS

CN  102081733  6/2011
CN  104503101  4/2015
(Continued)

OTHER PUBLICATIONS

International Search Report, issued in the corresponding PCT application No. PCT/CN2019/099261, dated Oct. 29, 2019, 7 pages.
(Continued)

*Primary Examiner* — Jayanti K Patel
*Assistant Examiner* — Christopher Kingsbury Glover
(74) *Attorney, Agent, or Firm* — Hamre, Schumann, Mueller & Larson, P.C.

(57) ABSTRACT

Disclosed are an image processing method and apparatus, and an image processing device. According to the image processing method and apparatus, and the image processing
(Continued)

device, an infrared binocular camera collects images formed when a measured object is illuminated by a speckle pattern projected by a projection assembly to obtain a first image collected by a first camera and a second image collected by a second camera; and three-dimensional data of the measured object is determined according to a pair of images constituted by the first image and the second image. By means of the method, three-dimensional data of a measured object can be relatively accurately obtained through measurement, thereby improving precision and accuracy of measurement, and also precision requirements for a projection assembly are low, so that costs can be lowered.

16 Claims, 4 Drawing Sheets

(51) Int. Cl.
    *H04N 5/225*     (2006.01)
    *H04N 5/247*     (2006.01)
    *G06V 10/60*     (2022.01)
    *G06V 10/75*     (2022.01)
    *G06K 9/62*     (2022.01)

(52) U.S. Cl.
    CPC ......... *G06V 10/757* (2022.01); *H04N 5/2256* (2013.01); *H04N 5/247* (2013.01); *G06T 2207/10024* (2013.01); *G06T 2207/10028* (2013.01); *G06T 2207/10048* (2013.01)

(56) References Cited

U.S. PATENT DOCUMENTS

| | | | | |
|---|---|---|---|---|
| 2009/0196149 A1* | 8/2009 | Atarashi | ............... | G11B 7/1374 |
| 2012/0212572 A1* | 8/2012 | Yang | ..................... | H04N 7/142 |
| | | | | 348/E7.083 |
| 2013/0100256 A1* | 4/2013 | Kirk | ........................ | G06T 7/593 |
| | | | | 348/48 |
| 2015/0229911 A1* | 8/2015 | Ge | .......................... | G06T 7/521 |
| | | | | 348/47 |
| 2015/0381972 A1* | 12/2015 | Kowdle | .................. | G06T 7/521 |
| | | | | 348/51 |
| 2018/0041747 A1* | 2/2018 | Zhou | ...................... | G01C 11/12 |
| 2018/0184071 A1* | 6/2018 | Xu | ......................... | H04N 5/332 |
| 2019/0087968 A1* | 3/2019 | Grunnet-Jepsen | ... | H04N 13/254 |

FOREIGN PATENT DOCUMENTS

| | | |
|---|---|---|
| CN | 106225764 | 12/2016 |
| CN | 106296801 | 1/2017 |
| CN | 106454287 | 2/2017 |
| CN | 106572340 | 4/2017 |
| CN | 106595528 | 4/2017 |
| CN | 106774850 | 5/2017 |
| CN | 106954058 | 7/2017 |
| CN | 107255498 | 10/2017 |
| CN | 107995434 | 5/2018 |
| CN | 108053449 | 5/2018 |
| CN | 108234984 | 6/2018 |
| CN | 109190484 | 1/2019 |

OTHER PUBLICATIONS

First Office Action, issued in the corresponding Chinese application No. 201810888231.9, dated Apr. 29, 2020, 26 pages.
Second Office Action, issued in the corresponding Chinese application No. 201810888231.9, dated Dec. 2, 2020, 17 pages.
"Research on 3D Model Reconstruction Method Based on Binocular Stereo Vision", North University of China, Jun. 6, 2014, 26 pages.

* cited by examiner

IMAGE PROCESSING METHOD AND APPARATUS, AND IMAGE PROCESSING DEVICE USING INFRARED BINOCULAR CAMERAS TO OBTAIN THREE-DIMENSIONAL DATA

The present application claims the priority of Chinese patent application No. 201810888231.9, filed on Aug. 6, 2018, the entire disclosure of which is incorporated herein by reference as part of the disclosure of this application.

TECHNICAL FIELD

Embodiments of the present disclosure relate to an image processing method, an apparatus, and an image processing device.

BACKGROUND

In recent years, 3D (three dimensions) image acquisition modules have become increasingly and widely used in electronic devices such as smart mobile terminals, which can be used to perceive the depth information of the object, and then obtain the three-dimensional outline of the object. However, it is known that 3D image acquisition modules (such as 3D structured light modules) raise high requirements on the accuracy of the module components, which lead to complicated production process and high production costs. Due to the limitation of the manufacturing process of the module components, it is difficult to improve the precision and accuracy of the obtained depth information of the object.

SUMMARY

In view of this, at least one embodiment of the present disclosure provides an image processing method, an apparatus, and an image processing device, which can improve the precision and accuracy of the measurement while at a lower cost.

In order to achieve the foregoing objectives, the technical solutions adopted in the embodiments of the present disclosure are as follows.

In the first aspect, an embodiment of the present disclosure provides an image processing method, which comprises:

obtaining, through an infrared binocular camera, a pair of images by acquiring an image formed by a measured object under irradiation of a speckle pattern projected by a projection component, where the pair of images comprise a first image acquired by a first camera of the infrared binocular camera and a second image acquired by a second camera of the infrared binocular camera; and determining three-dimensional data of the measured object according to the pair of images.

With reference to the first aspect, the embodiments of the present disclosure provide the first possible implementation manner of the first aspect, and determining the three-dimensional data of the measured object according to the pair of images comprises:

performing feature point matching between the first image and the second image;

determining a positional deviation between corresponding feature points in the first image and the second image; and determining the three-dimensional data of the measured object, according to the positional deviation between the corresponding feature points and a pre-stored parameter of the infrared binocular camera.

With reference to the first possible implementation manner of the first aspect, an embodiment of the present disclosure provides a second possible implementation manner of the first aspect, and performing feature point matching between the first image and the second image comprises:

according to brightness values of pixel points comprised in feature points in the first image and feature points in the second image, performing feature point matching between the first image and the second image.

With reference to the first possible implementation manner of the first aspect, an embodiment of the present disclosure provides a third possible implementation manner of the first aspect, and determining the positional deviation between the corresponding feature points in the first image and the second image comprises:

according to a position coordinate of the corresponding feature points in the first image and a position coordinate of the corresponding feature points in the second image, determining the positional deviation between the corresponding feature points in the first image and the second image.

With reference to the first possible implementation manner of the first aspect, an embodiment of the present disclosure provides a fourth possible implementation manner of the first aspect, and determining the three-dimensional data of the measured object according to the positional deviation between the corresponding feature points and the pre-stored parameter of the infrared binocular camera comprises:

determining a vertical distance of each feature point of the measured object relative to the infrared binocular camera, according to the positional deviation between the corresponding feature points, a pre-stored focal length of the infrared binocular camera and a distance between an optical axis of the first camera and an optical axis of the second camera; and determining the three-dimensional data of the measured object, according to the vertical distance of each feature point of the measured object relative to the infrared binocular camera.

With reference to the first aspect, an embodiment of the present disclosure provides a fifth possible implementation manner of the first aspect, and the method further comprises:

acquiring a color image of the measured object by a visible light camera; and establishing a three-dimensional model of the measured object according to the color image and the three-dimensional data of the measured object.

In the second aspect, an embodiment of the present disclosure provides an image processing apparatus, which comprises:

an image acquisition unit, configured to obtain, through an infrared binocular camera, a pair of images by acquiring an image formed by a measured object under irradiation of a speckle pattern projected by a projection component, the pair of images comprising a first image acquired by a first camera of the infrared binocular camera and a second image acquired by a second camera of the infrared binocular camera; and a computing unit, configured to determine three-dimensional data of the measured object according to the pair of images.

In the third aspect, an embodiment of the present disclosure provides an image processing device which comprises a projection component, an infrared binocular camera, and an image processing chip.

The projection component is configured to project a speckle pattern to a measured object;

the infrared binocular camera is configured to acquire a speckle image formed by the measured object under irradiation of the speckle pattern; and the image processing chip is configured to, according to the speckle image, determine three-dimensional data of the measured object by adopting the method according to any one of the first aspect.

With reference to the third aspect, the embodiments of the present disclosure provide the first possible implementation manner of the third aspect, the projection component comprises a light source, a beam shaper, and a diffraction grating arranged in sequence, and light emitted by the light source passes through the beam shaper and the diffraction grating in turn to form the speckle pattern and is emitted.

With reference to the first possible implementation manner of the third aspect, an embodiment of the present disclosure provides a second possible implementation manner of the third aspect, and the light source is a VCSEL transmitter.

With reference to the first possible implementation manner of the third aspect, an embodiment of the present disclosure provides a third possible implementation manner of the third aspect, and the beam shaper comprises an optical lens having beam expanding and collimating function.

With reference to the first possible implementation manner of the third aspect, an embodiment of the present disclosure provides a forth possible implementation manner of the third aspect, and the light source is an infrared source.

With reference to the third aspect, an embodiment of the present disclosure provides a fifth possible implementation manner of the third aspect, and an optical axis of a first camera of the infrared binocular camera is parallel with an optical axis of a second camera of the infrared binocular camera.

With reference to the third aspect or the fifth possible implementation manner of the third aspect, an embodiment of the present disclosure provides a sixth possible implementation manner of the third aspect, the device further comprises a visible light camera, and the visible light camera is configured to connect the image processing chip, and transmit a color image, that is acquired, of the measured object to the image processing chip, so that the image processing chip establishes a three-dimensional model of the measured object according to the image acquired by the infrared binocular camera and the color image acquired by the visible light camera.

With reference to the third aspect or the fifth possible implementation manner of the third aspect, an embodiment of the present disclosure provides a seventh possible implementation manner of the third aspect, the device further comprises a fill light, and the fill light is configured to provide light compensation in the case where the ambient light is insufficient.

With reference to the seventh possible implementation manner of the third aspect, an embodiment of the present disclosure provides an eighth possible implementation manner of the third aspect, and the wavelength of light emitted by the fill light is consistent with the wavelength of light emitted by a light source of the projection component or the wavelength of light acquired by the infrared binocular camera.

In the fourth aspect, the embodiment of the present disclosure also provides a computer-readable storage medium on which a computer program is stored, and when the computer program is run by a processor, the steps of the method according to any one of the first aspects are executed.

In the image processing method, the apparatus, and the image processing device provided by the embodiments of the present disclosure, a first image acquired by a first camera and a second image acquired by a second camera are obtained, through an infrared binocular camera, by acquiring an image formed by a measured object under irradiation of a speckle pattern projected by a projection component, and three-dimensional data of the measured object is determined according to the pair of images including the first image and the second image. By adopting this method, the three-dimensional data of the measured object can be measured more accurately, the precision and accuracy of the measurement are improved, and the accuracy requirements of the projection component are low, and the cost can be reduced.

Other features and advantages of the present disclosure will be described in the following specification, or part of the features and advantages can be inferred from the specification or determined without doubt, or can be learned by implementing the above-mentioned technology of the present disclosure.

In order to make the above-mentioned objectives, features and advantages of the present disclosure more obvious and understandable, optional embodiments accompanied with accompanying drawings are described in detail below.

BRIEF DESCRIPTION OF THE DRAWINGS

In order to more clearly illustrate the specific embodiments of the present disclosure or the technical solutions in the prior art, the drawings that to be used in the description of specific embodiments or the prior art will be briefly described in the following. Obviously, the drawings in the following description are some embodiments of the present disclosure. For those of ordinary skill in the art, other drawings can be obtained based on these drawings without creative work.

Figure 1:
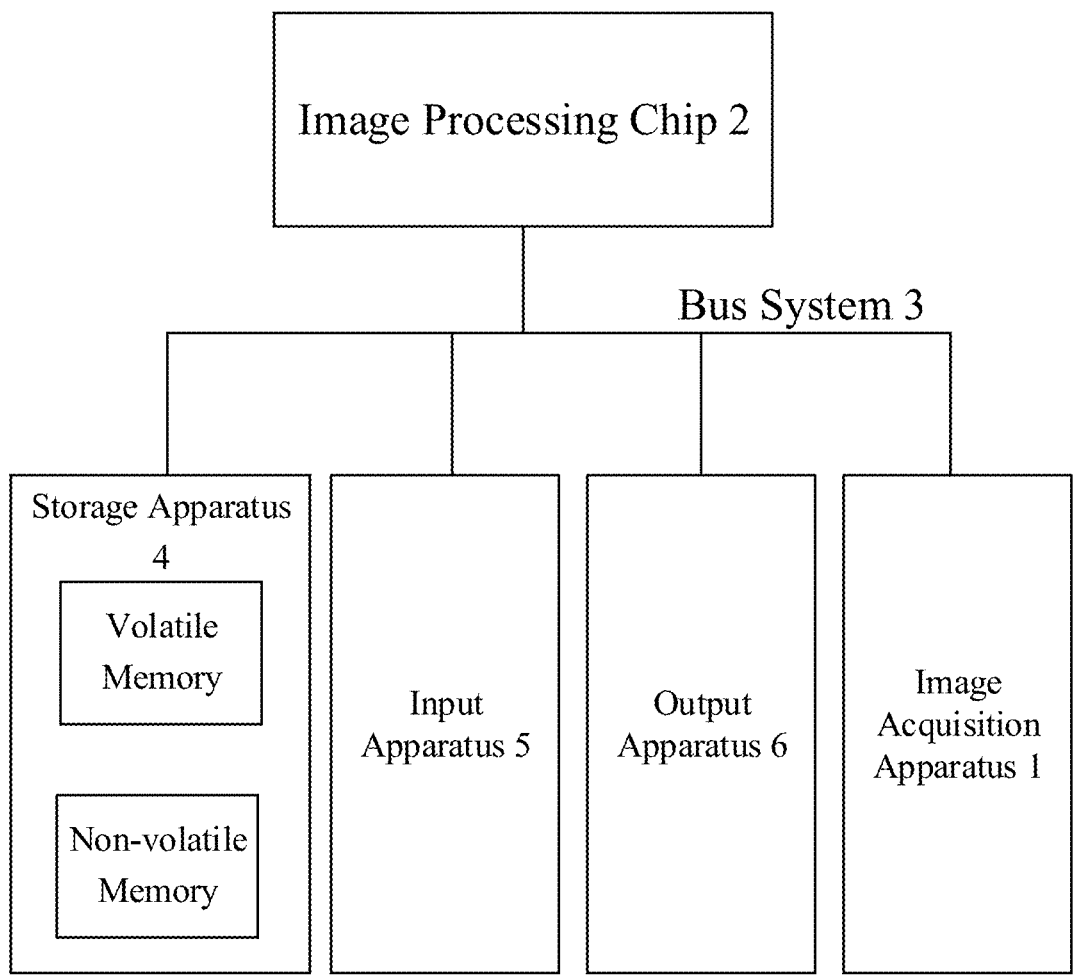
FIG. 1 illustrates a structural block diagram of an image processing device provided by an embodiment of the present disclosure.

Reference numerals: 1—image acquisition apparatus; 11—projection component; 111—light source; 112—beam shaper; 113—diffraction grating; 12—infrared binocular camera; 121—first camera; 122—second camera; 13—fill light; 14—visible light camera; 2—image processing chip;

3—bus system; 4—storage apparatus; 5—input apparatus; 6—output apparatus; 61—image acquisition unit; 62—computing unit.

DETAILED DESCRIPTION

In order to make objectives, technical solutions and advantages of the embodiments of the present disclosure clearer, the technical solutions of the present disclosure will be described in a clearly and completely way in connection with the drawings. Apparently, the described embodiments are just a part but not all of the embodiments of the disclosure. Based on the described embodiments herein, those skilled in the art can obtain other embodiment(s), without any inventive work, which should be within the scope of the disclosure.

In view of the problem that the known 3D image acquisition module raises high requirements on the accuracy of the module components, resulting in high production costs, the embodiments of the present disclosure provide an image processing method, an apparatus, and an image processing device, which can reduce production costs and improve measurement precision and accuracy. The following describes the embodiments of the present disclosure in detail.

The embodiment provides an image processing device, as illustrated in FIG. 1, the image processing device can comprises one or more image processing chips 2, one or more storage apparatuses 4, an input apparatus 5, an output apparatus 6 and an image acquisition apparatus 1. These components are interconnected through a bus system 3 and/or other forms of connection mechanisms (not illustrated). It should be noted that the components and structure of the image processing device illustrated in FIG. 1 are only exemplary and not restrictive. The image processing device may also have other components and structures as required.

Figure 2:
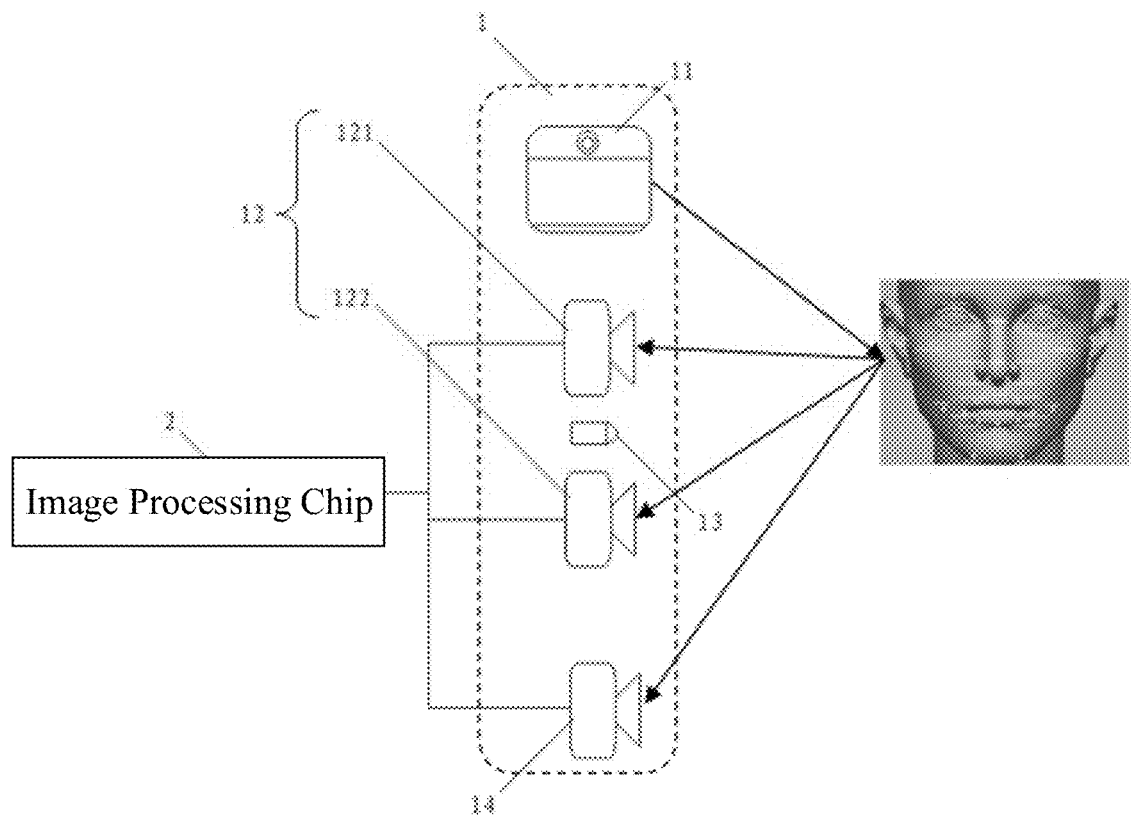
FIG. 2 illustrates a schematic structural diagram of another image processing device provided by an embodiment of the present disclosure.

The structure of the image acquisition apparatus 1 is illustrated in FIG. 2 and may include a projection component 11 and an infrared binocular camera 12.

Figure 3:
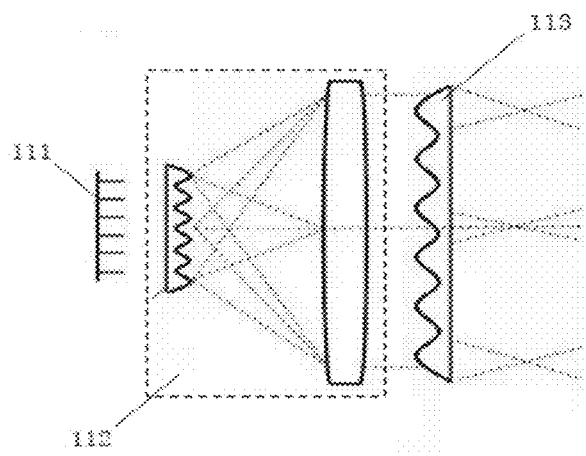
FIG. 3 illustrates a schematic structural diagram of the projection component 11 provided by an embodiment of the present disclosure.

The projection component 11 is configured to project a speckle pattern to a measured object. The speckle pattern can be a uniform point cloud pattern or a random point cloud pattern, which is used as a feature point for binocular vision operations. As illustrated in FIG. 3, the projection component 11 can comprise a light source 111, a beam shaper 112 and a diffraction grating 113 arranged in sequence. The coherent light emitted by the light source 111 passes through the beam shaper 112 and the diffraction grating 113 in sequence, and then forms a speckle pattern and is emitted. The speckle pattern is generated by the coherent light emitted by the light source 111 after passing through the above-mentioned optical components, and the essence of the speckle pattern is an interference phenomenon caused by the superposition of numerous light wavefronts with random phases. In the process of free propagation in space, the speckle pattern can uniquely code each area of the distribution space of the speckle pattern, and therefore, according to the speckle image formed by a measured object under irradiation of the speckle pattern, three-dimensional data of the measured object can be calculated.

For example, the light source 111 can be an infrared light source, and the emitted coherent light is infrared light. For example, a vertical cavity surface emitting laser (VCSEL) transmitter or an infrared LED can be used to emit invisible infrared light. The VCSEL transmitter is made on the basis of gallium arsenide semiconductor material, and mainly contains three parts: laser working material, pumping source and optical resonant cavity. The VCSEL transmitter has the advantages of high spectral accuracy, fast response speed, long service life and long projection distance.

The beam shaper 112 includes an optical lens having beam expanding and collimating function. After the coherent light beam emitted by the light source 111 passes through the beam shaper 112, the diameter and divergence angle of the light beam are changed, and then the coherent light beam is emitted in a direction perpendicular to the beam shaper 112. The diffraction grating 113 can adopt diffractive optical element (DOE). The DOE is an optical device composed of dense and equally spaced parallel scribed lines. The DOE uses multi-slit diffraction and interference to disperse the light irradiated on the DOE according to different wavelengths, so as to form a speckle pattern and project the speckle pattern onto the measured object.

The infrared binocular camera 12 is used to connect the image processing chip 2 to transmit the acquired speckle image formed by the measured object under irradiation of the speckle pattern emitted by the projection component 11 to the image processing chip 2, so that the image processing chip 2 determines the three-dimensional data of the measured object according to the speckle image of the measured object.

The infrared binocular camera 12 includes a first camera 121 and a second camera 122. For example, both the first camera 121 and the second camera 122 are infrared cameras. The infrared camera can include an infrared complementary metal oxide semiconductor (CMOS) component, a narrow-band filter, and a lens arranged in sequence. The infrared CMOS component can receive a pattern formed by the infrared light reflected by the measured object. The narrow-band filter allow light to pass through in a specific wavelength band, and light that deviates from this wavelength band is blocked. In an embodiment, the light source adopts a VCSEL transmitter that emits infrared light with a wavelength of 940 nm. Therefore, the infrared camera needs to reject ambient light of wavelength other than 940 nm and only receives infrared light at 940 nm. The narrow-band filter is used for this purpose, so that the lens only images infrared light around 940 nm. The narrow-band filter mainly adopts the principle of interference and consists of dozens of layers of optical coatings.

An optical axis of the first camera 121 is parallel with an optical axis of the second camera 122. The two cameras can acquire images of the measured object in respective fields of view, and transmit the images to the image processing chip 2. Therefore, the image processing chip 2 can obtain two images of the measured object, that is, a first image acquired by the first camera 121 and a second image acquired by the second camera 122. Based on a pair of images composed of the first image and the second image, using the binocular depth algorithm, the three-dimensional data of the measured object can be calculated.

The image processing device provided by this embodiment adopts an infrared binocular camera and calculates the three-dimensional data of the measured object by using the binocular depth algorithm. Compared with the known solution where monocular camera is adopted and the three-dimensional data of the measured object is calculated through interpolation, this embodiment completely uses the actual data acquired without interpolation, so the precision and accuracy of the measurement can be improved.

In addition, the prior art adopts monocular camera, and needs the projection components to project speckles with specific codes. In the case where the projected speckles are slightly deviated, it may have great impact on the calculation results, so the accuracy and manufacturing process requirements of the projection components need to be high. Due to adopting the infrared binocular camera, the light emitted by the projection component can be random speckle, no specific coding is required. The deviation of the speckle pattern projected on the measured object has little effect on the calculation result, and requirements on the accuracy and manufacturing process of the projection component are low, which can increase the yield of the projection component and reduce the manufacturing cost. Moreover, because there is no need to project specific coded speckles, the emission efficiency of the projection component can also be improved.

For example, the image acquisition apparatus 1 provided by the embodiment of the present disclosure may further comprise a fill light 13. The fill light 13 is configured to provide light compensation in the case where the ambient light is insufficient. The wavelength of light emitted by the fill light 13 is consistent with the wavelength of light emitted by the light source of the projection component or the wavelength of light acquired by the infrared binocular camera. The fill light 13 can be, but is not limited to be, arranged between the first camera 121 and the second camera 122 of the infrared binocular camera 12.

In another embodiment, the image acquisition apparatus 1 can further include a visible light camera 14. The visible light camera 14 is configured to connect the image processing chip 2, and transmit a color image, that is acquired, of the measured object to the image processing chip 2, so that the image processing chip 2 establishes a three-dimensional model of the measured object according to the image acquired by the infrared binocular camera 12 and the color image acquired by the visible light camera 14. Through the visible light camera 14, more detailed features of the measured object can also be obtained. For example, in the case where the measured object is a human face, detailed information such as small wrinkles and small acne scars on the face can be obtained by the visible light camera 14, thereby providing stronger basic capabilities to meet high-precision requirements such as payment and living detection.

The image processing chip 2 has image processing capabilities. The image processing chip 2 receives two images of the measured object acquired by the infrared binocular camera in the image acquisition apparatus 1. Based on the two images, the image processing chip 2 calculates the three-dimensional data of the measured object by using the binocular depth algorithm. In the case where the three-dimensional data of a human face is acquired, the image processing chip 2 can perform face recognition based on the three-dimensional data, which is used for unlocking of electronic devices and mobile payment. In this case, in the case where the distance between the measured object and the electronic device ranges from 25 cm to 120 cm, a relatively accurate recognition result can be obtained.

For example, the image processing chip 2 can also simultaneously receive the color image of the measured object acquired by the visible light camera in the image acquisition apparatus 1, and establish a three-dimensional model of the measured object based on the image acquired by the binocular camera and the color image acquired by the visible light camera. For example, a three-dimensional model of a human face is established. In this case, in the case where the distance between the measured object and the electronic device ranges from 25 cm to 80 cm, relatively accurate modeling results can be obtained.

The image processing chip 2 can be a central processing unit (CPU), a graphics processing unit (GPU), a neural network processing unit (NPU), or other forms of processing units with data processing capabilities and/or instruction execution capabilities, and can control other components in the electronic device to perform the desired functions.

The storage apparatus 4 may include one or more computer program products, and the computer program products may include various forms of computer-readable storage media, such as volatile memory and/or non-volatile memory. The volatile memory may include, for example, random access memory (RAM) and/or cache memory (cache). The non-volatile memory may include, for example, read-only memory (ROM), hard disk, flash memory, etc. One or more computer program instructions can be stored on the computer-readable storage medium, and the image processing chip 2 can run the program instructions to implement the image processing function (implemented by the image processing chip) and/or other desired functions in the embodiments of the present disclosure described below. Various application programs and various data, such as various data used and/or generated by the application program, may also be stored in the computer-readable storage medium.

The input apparatus 5 may be a device used by the user to input instructions, and may include one or more of a keyboard, a mouse, a microphone, a touch screen, and the like.

The output apparatus 6 may output various information (for example, images or sounds) to the outside (for example, a user), and may include one or more of a display, a speaker, and the like.

For example, the above-mentioned image processing device can be implemented on an electronic camera or an all-in-one personal identification machine, and can also be implemented on a mobile terminal such as a smart phone or a tablet computer.

Aiming at the problem that the precision and accuracy are low in the case where the known 3D image acquisition component adopts a monocular camera to acquire the image of the measured object and the three-dimensional data of the measured object is calculated through interpolation, this embodiment provides an image processing method, which can be applied to the image processing device described in the above embodiments. It should be noted that the steps illustrated in the flowchart of the accompanying drawings can be executed in a computer system such as a set of computer-executable instructions, and although the logical sequence is illustrated in the flowchart, in some cases, the steps illustrated or described can be performed in a different order than that illustrated here. This embodiment is described in detail below.

Figure 4:
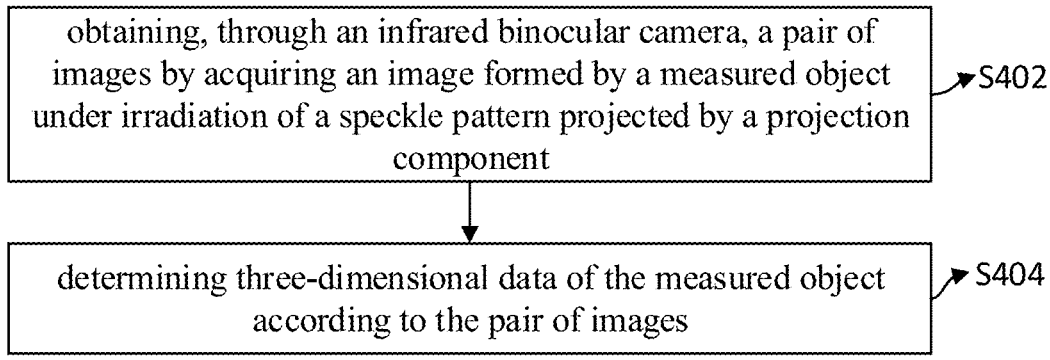
FIG. 4 illustrates a flowchart of an image processing method provided by an embodiment of the present disclosure.

FIG. 4 illustrates a flowchart of an image processing method provided by this embodiment. As illustrated in FIG. 4, the method includes following steps.

In step S402, a pair of images is obtained, through an infrared binocular camera, by acquiring an image formed by a measured object under irradiation of a speckle pattern projected by a projection component.

The pair of images comprises two images, that is, a first image acquired by a first camera of the infrared binocular camera and a second image acquired by a second camera of the infrared binocular camera. The image processing chip receives the first image of the measured object acquired by the first camera, and simultaneously receives the second image of the measured object acquired by the second camera.

In step S404, three-dimensional data of the measured object is determined according to the pair of images.

The image processing chip first preprocesses the received first image and second image respectively (including noise removal, image enhancement, etc.), and then performs feature point matching between the preprocessed first image and second image to determine the correspondence between the feature points in the first image and the feature points in the second image. The feature point can be a brighter area in the image. Taking that the measured object is a human face as an example, under the irradiation of the speckle pattern, the human face presents an alternating light and dark image that is invisible to the naked eye. The brighter point in the image is chosen as the feature point. The feature points of the same part of the face in the first image and the second image are matched. In the first image and the second image, a feature point may include a plurality of pixel points. The first feature point in the first image is chosen, and the brightness value of each pixel point contained in the first feature point is determined, and the second feature point corresponding to the first feature point is searched in the second image. The brightness value of each pixel point included in the second feature point is the same as the brightness value of each corresponding pixel point included in the first feature point. In the same way, by finding the corresponding feature points in the first image and the second image, the feature point matching between the first image and the second image is completed.

The positional deviation between the corresponding feature points in the first image and the second image is determined. For example, the position coordinate of the first feature point in the first image is determined, and the position coordinate of the second feature point corresponding to the first feature point in the second image is determined. According to the position coordinate of the first feature point and the position coordinate of the second feature point, the positional deviation between the first feature point and the second feature point is determined. In the same way, the positional deviation between other corresponding feature points in the first image and the second image can be determined.

Figure 7:
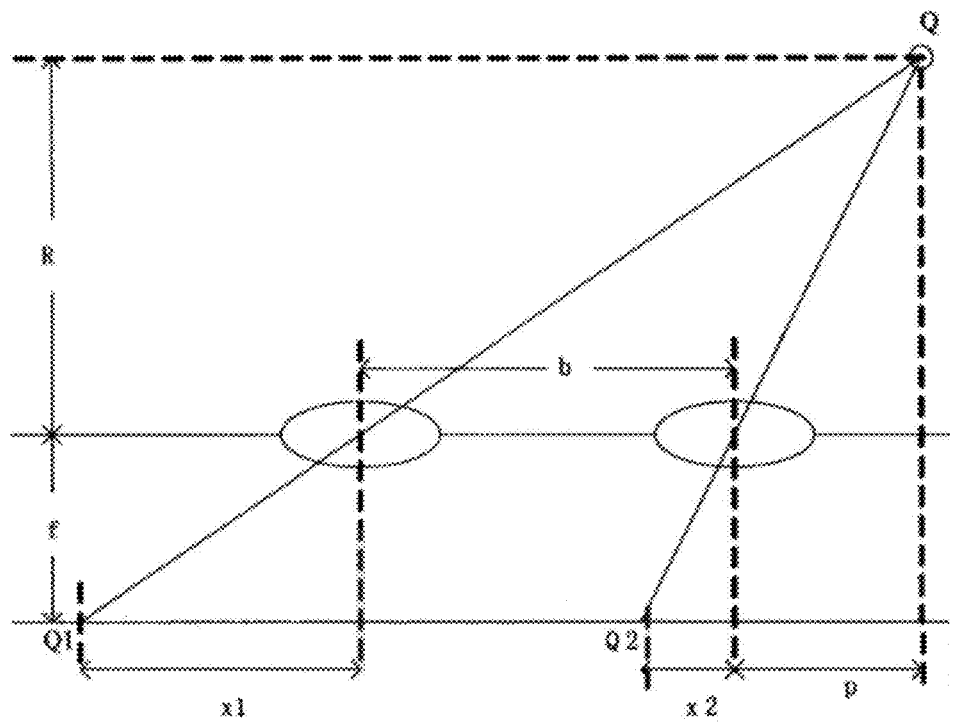
FIG. 7 illustrates a schematic diagram of a ranging method provided by an embodiment of the present disclosure.

The vertical distance of each feature point of the measured object relative to the infrared binocular camera is determined according to the positional deviation between the corresponding feature points, a pre-stored focal length of the infrared binocular camera, and a distance between an optical axis of the first camera and an optical axis of the second camera. For example, with reference to FIG. 7, the vertical distance R of the feature point Q on the measured object relative to the infrared binocular camera is determined, that is, the vertical distance R between the feature point Q and the plane where the connection between the first camera and the second camera is located. The principle is as follows. It is supposed that the focal lengths of the first camera and the second camera are both f, the distance between the optical axis of the first camera and the optical axis of the second camera is b, the deviate distance between the feature point Q and the optical axis of the second camera is p, and the deviate distance between the feature point Q and the optical axis of the first camera is p+b. The imaging point of the feature point Q in the first image is the first feature point Q1, and the imaging point of the feature point Q in the second image is the second feature point Q2. Based on the principle of triangulation, the formulas below can be obtained:

$$\frac{R}{p} = \frac{R+f}{p+x_2}$$

$$\frac{R}{p+b} = \frac{R+f}{p+x_1+b}$$

Combining the above two formulas, the formula below can be calculated:

$$R = \frac{bf}{x_1 - x_2}$$

In the formula above, x1-x2 is the positional deviation between the first feature point and the second feature point, b is the distance between the optical axis of the first camera and the optical axis of the second camera, and f is the focal length of the infrared binocular camera. According to the above three parameters, the vertical distance of the characteristic point Q relative to the infrared binocular camera can be obtained.

The vertical distance of each feature point of the measured object relative to the infrared binocular camera is determined, that is, the spatial coordinates of each feature point on the surface of the measured object can be determined, which is also called the point cloud information of the measured object. The point cloud information of the measured object is used as the three-dimensional data of the measured object.

Compared with the known image processing device, which adopts the monocular camera and calculate the three-dimensional data of the measured object through the interpolation method, this method calculates based on the actual data in the acquired image, which can reduce the measurement error and improve the measurement accuracy. For example, in the case where the measured object is 40 cm away from the electronic device, the root mean square error of the measurement result can be reduced to 0.6631 mm. The root mean square error is the square root of the ratio of the sum of the squares of the deviations between the measurement results and the actual values and the number of measurements.

Figure 5:
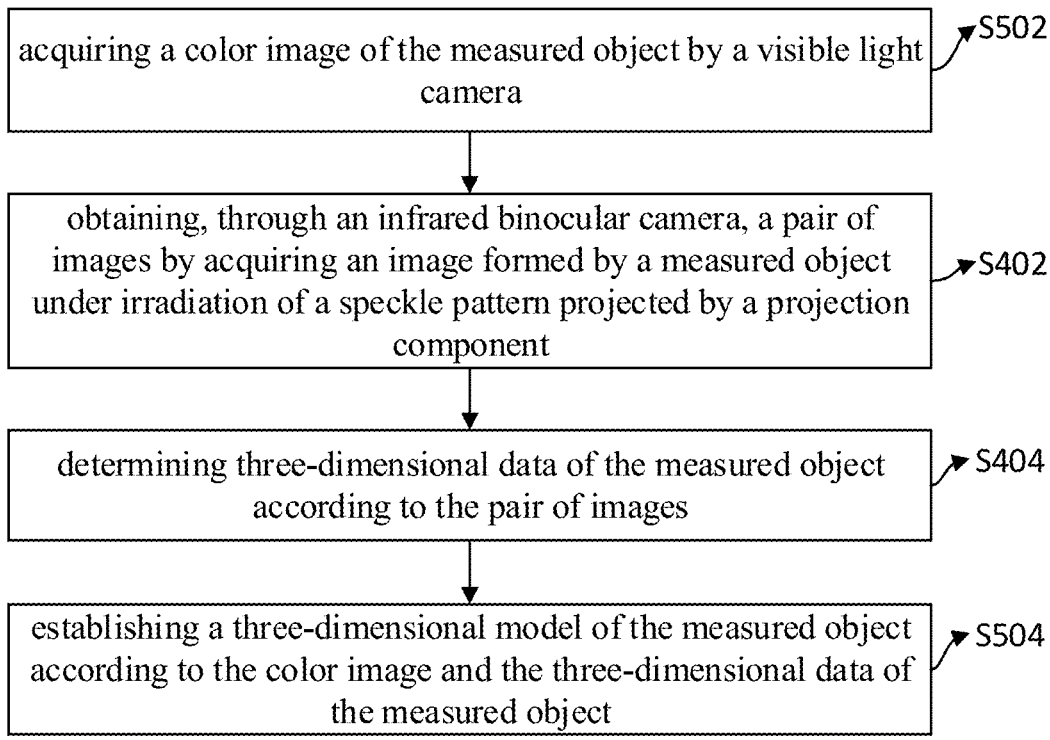
FIG. 5 illustrates a flowchart of another image processing method provided by an embodiment of the present disclosure.

As illustrated in FIG. 5, in an embodiment, the above method may further comprises:

step S502, acquiring a color image of the measured object by a visible light camera.

Step S502 can be executed before step S402, or may be executed after step S402 or step S404. The image processing chip receives the color image of the measured object acquired by the visible light camera.

In step S504, a three-dimensional model of the measured object is established according to the color image and the three-dimensional data of the measured object.

After the three-dimensional data of the measured object is obtained in step S404, a gray-scale stereo image of the measured object can be constructed according to the three-dimensional data of the measured object. By overlaying the color of the measured object in the color image on the surface of the gray-scale stereo image of the measured object, the three-dimensional model of the measured object can be obtained. This method can be applied to situations such as frontal portrait blurring and simulating dynamic expressions of characters.

In the image processing method provided by the embodiment of the present disclosure, the image of the measured object is acquired through a binocular camera, and the spatial coordinates of the measured object are calculated, and the spatial coordinates corresponding to each feature point can be obtained, thereby improving the precision and accuracy of measurement. When combined with the visible light camera to acquire the color image of the measured object, the color characteristics of the measured object can be obtained and the three-dimensional model of the measured object can be established.

Figure 6:
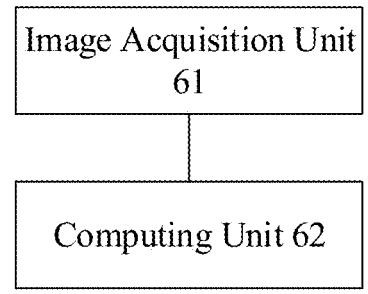
FIG. 6 illustrates a structural block diagram of an image processing apparatus provided by an embodiment of the present disclosure.

Corresponding to the image processing method provided in the foregoing embodiment, this embodiment provides an image processing apparatus, which is applied to the electronic device described in the foregoing embodiments. FIG. 6 illustrates a schematic structural diagram of an image acquisition apparatus provided by an embodiment of the present disclosure. As illustrated in FIG. 6, the apparatus includes following units.

An image acquisition unit 61 is configured to obtain, through an infrared binocular camera, a pair of images by acquiring an image formed by a measured object under irradiation of a speckle pattern projected by a projection component. The pair of images comprises a first image acquired by a first camera of the infrared binocular camera and a second image acquired by a second camera of the infrared binocular camera.

A computing unit 62 is configured to determine three-dimensional data of the measured object according to the pair of images.

The computing unit 62 is also configured to perform feature point matching between the first image and the second image to determine the correspondence between feature points in the first image and feature points in the second image, determine a positional deviation between corresponding feature points in the first image and the second image, and determine the three-dimensional data of the measured object according to the positional deviation between the corresponding feature points and a pre-stored parameter of the infrared binocular camera. For example, according to brightness values of pixel points comprised in feature points in the first image and feature points in the second image, feature point matching is performed between the first image and the second image. According to a position coordinate of the corresponding feature points in the first image and a position coordinate of the corresponding feature points in the second image, the positional deviation between the corresponding feature points in the first image and the second image is determined. The vertical distance of each feature point of the measured object relative to the infrared binocular camera is determined, according to the positional deviation between the corresponding feature points, a pre-stored focal length of the infrared binocular camera and a distance between an optical axis of the first camera and an optical axis of the second camera. The three-dimensional data of the measured object is determined according to the vertical distance of each feature point of the measured object relative to the infrared binocular camera.

In an embodiment, the image acquisition unit 61 is also configured to acquire a color image of the measured object by a visible light camera. The above apparatus also comprises a modeling unit connected to the computing unit 62. The modeling unit is configured to establish a three-dimensional model of the measured object according to the color image and the three-dimensional data of the measured object.

The implementation principles and technical effects of the apparatus provided in this embodiment are the same as those of the foregoing embodiments. For a brief description, for the parts not mentioned in the apparatus embodiment, reference can be made to the corresponding content in the foregoing method embodiments.

By using the image processing apparatus provided by the embodiments of the present disclosure, the image of the measured object is acquired through an infrared binocular camera, and the spatial coordinates of the measured object are calculated, and the spatial coordinates corresponding to each feature point can be obtained, thereby improving the precision and accuracy of measurement. When combined with the visible light camera to acquire the color image of the measured object, the color characteristics of the measured object can be obtained and the three-dimensional model of the measured object can be established.

For example, this embodiment also provides a computer-readable storage medium with a computer program stored on the computer-readable storage medium, and the computer program executes the steps of the method provided in the foregoing method embodiment when the computer program is run by a processor.

The computer program product of the image processing method and apparatus provided by the embodiments of the present disclosure comprises a computer-readable storage medium storing program codes. The instructions included in the program codes can be used to execute the method described in the previous method embodiments. For specific implementation, reference can be made to the method embodiments, which is not repeated here.

In the case where the function is implemented in the form of a software functional unit and sold or used as an independent product, it can be stored in a computer-readable storage medium. Based on this understanding, the technical solution of the present disclosure essentially or the part that contributes to the prior art or the part of the technical solution can be embodied in the form of a software product, and the computer software product is stored in a storage medium, and includes a number of instructions to enable a computer device (which may be a personal computer, a server, a network device, etc.) to execute all or part of the steps of the method described in the various embodiments of the present disclosure. The aforementioned storage media include: USB, mobile hard disk, read-only memory (ROM), random access memory (RAM), magnetic disks, optical disks or other media that can store program codes.

Finally, it should be noted that the above-mentioned embodiments are only specific implementations of the present disclosure, which are used to illustrate the technical solutions of the present disclosure, rather than limit the technical solutions of the present disclosure. The protection scope of the present disclosure is not limited to this. Although the present disclosure has been described in detail with reference to the foregoing embodiments, those of ordinary skill in the art should understand that any person skilled in the art can modify or easily change the technical solutions described in the foregoing embodiments, or equivalently replace some technical features thereof within the technical scope disclosed in the present disclosure. These modifications, changes or replacements do not deviate the essence of the corresponding technical solutions from the spirit and scope of the technical solutions of the embodiments of the present disclosure, which should be covered within the protection scope of the present disclosure. Therefore, the protection scope of the present disclosure should be subject to the protection scope of the claims.

What is claimed is:

1. An image processing method, comprising:
   obtaining, through an infrared binocular camera, a pair of images by acquiring an image formed by a measured object under irradiation of a speckle pattern projected by a projection component, wherein the pair of images comprise a first image acquired by a first camera of the infrared binocular camera and a second image acquired by a second camera of the infrared binocular camera; and determining three-dimensional data of the measured object according to the pair of images, wherein determining the three-dimensional data of the measured object according to the pair of images comprises:

choosing feature points of the measured object in the first image;

according to correspondence between brightness values of pixel points comprised in the feature points in the first image and feature points in the second image, determining in the second image the features points that correspond to the features points in the first image by performing feature point matching between the first image and the second image;

determining a positional deviation between corresponding feature points in the first image and the second image; and determining the three-dimensional data of the measured object, according to the positional deviation between the corresponding feature points and a pre-stored parameter of the infrared binocular camera.

2. The method according to claim 1, wherein determining the positional deviation between the corresponding feature points in the first image and the second image comprises:

according to a position coordinate of the corresponding feature points in the first image and a position coordinate of the corresponding feature points in the second image, determining the positional deviation between the corresponding feature points in the first image and the second image.

3. The method according to claim 1, wherein determining the three-dimensional data of the measured object according to the positional deviation between the corresponding feature points and the pre-stored parameter of the infrared binocular camera comprises:

determining a vertical distance of each feature point of the measured object relative to the infrared binocular camera, according to the positional deviation between the corresponding feature points, a pre-stored focal length of the infrared binocular camera and a distance between an optical axis of the first camera and an optical axis of the second camera; and determining the three-dimensional data of the measured object, according to the vertical distance of each feature point of the measured object relative to the infrared binocular camera.

4. The method according to claim 1, further comprising:

acquiring a color image of the measured object by a visible light camera; and establishing a three-dimensional model of the measured object according to the color image and the three-dimensional data of the measured object.

5. An image processing device, comprising a projection component, an infrared binocular camera, and an image processing chip, wherein the projection component is configured to project a speckle pattern to a measured object;

the infrared binocular camera is configured to acquire a speckle image formed by the measured object under irradiation of the speckle pattern; and the image processing chip is configured to, according to the speckle image, determine three- dimensional data of the measured object by adopting the method according to claim 1.

6. The device according to claim 5, wherein the projection component comprises a light source, a beam shaper, and a diffraction grating arranged in sequence, and light emitted by the light source passes through the beam shaper and the diffraction grating in turn to form the speckle pattern and is emitted.

7. The device according to claim 5, wherein an optical axis of a first camera of the infrared binocular camera is parallel with an optical axis of a second camera of the infrared binocular camera.

8. The device according to claim 5, wherein the device further comprises a visible light camera, and the visible light camera is configured to connect the image processing chip, and transmit a color image, that is acquired, of the measured object to the image processing chip, so that the image processing chip establishes a three-dimensional model of the measured object according to the image acquired by the infrared binocular camera and the color image acquired by the visible light camera.

9. The device according to claim 5, wherein the device further comprises a fill light, and the fill light is configured to provide light compensation in a case where ambient light is insufficient.

10. The device according to claim 9, wherein a wavelength of light emitted by the fill light is consistent with a wavelength of light emitted by a light source of the projection component or a wavelength of light acquired by the infrared binocular camera.

11. A non-transitory computer-readable storage medium, wherein a computer program is stored on the computer-readable storage medium, and the computer program executes steps of the method according to claim 1 in a case where the computer program is run by a processor.

12. An image processing device, comprising a projection component, an infrared binocular camera, and an image processing chip, wherein the projection component is configured to project a speckle pattern to a measured object;

the infrared binocular camera is configured to acquire a speckle image formed by the measured object under irradiation of the speckle pattern; and the image processing chip is configured to, according to the speckle image, determine three- dimensional data of the measured object by adopting the method according to claim 2.

13. An image processing device, comprising a projection component, an infrared binocular camera, and an image processing chip, wherein the projection component is configured to project a speckle pattern to a measured object;

the infrared binocular camera is configured to acquire a speckle image formed by the measured object under irradiation of the speckle pattern; and the image processing chip is configured to, according to the speckle image, determine three- dimensional data of the measured object by adopting the method according to claim 3.

14. The device according to claim 7, wherein the device further comprises a visible light camera, and the visible light camera is configured to connect the image processing chip, and transmit a color image, that is acquired, of the measured object to the image processing chip, so that the image processing chip establishes a three-dimensional model of the measured object according to the image acquired by the infrared binocular camera and the color image acquired by the visible light camera.

15. The device according to claim 7, wherein the device further comprises a fill light, and the fill light is configured to provide light compensation in a case where ambient light is insufficient.

16. An image processing apparatus, comprising:
  an image acquisition unit, configured to obtain, through an infrared binocular camera, a pair of images by acquiring an image formed by a measured object under irradiation of a speckle pattern projected by a projection component, the pair of images comprising a first image acquired by a first camera of the infrared binocular camera and a second image acquired by a second camera of the infrared binocular camera; and
  a computing unit, configured for:
    choosing feature points of the measured object in the first image;
      according to correspondence between brightness values of pixel points comprised in the feature points in the first image and feature points in the second image, determining in the second image the features points that correspond to the features points in the first image to perform feature point matching between the first image and the second image;
    determine a positional deviation between corresponding feature points in the first image and the second image; and
    determine the three-dimensional data of the measured object, according to the positional deviation between the corresponding feature points and a pre-stored parameter of the infrared binocular camera.

\* \* \* \* \*